United States Patent [19]

Dixon

[11] 4,443,171

[45] Apr. 17, 1984

[54] MULTI-MOTION MECHANICAL PRESS

[75] Inventor: James N. Dixon, DuBois, Pa.

[73] Assignee: Wesjay, Inc., Greenville, Pa.

[21] Appl. No.: 368,110

[22] Filed: Apr. 14, 1982

[51] Int. Cl.³ .......................... B29C 3/00; B30B 11/02

[52] U.S. Cl. ........................................ 425/78; 425/352

[58] Field of Search ........................... 425/78; 264/120

[56] References Cited

U.S. PATENT DOCUMENTS

| | | | |
|---|---|---|---|
| 1,607,389 | 11/1926 | Claus | 425/78 |
| 2,253,003 | 8/1941 | Whipple | 425/78 |
| 2,338,491 | 1/1944 | Cutler | 425/78 |
| 2,389,561 | 11/1945 | Stokes | 425/78 |
| 2,499,980 | 3/1950 | Stokes | 425/78 |
| 2,556,951 | 6/1951 | Weidner | 425/78 |
| 2,570,989 | 10/1951 | Seelig | 425/78 |
| 2,640,325 | 6/1953 | Haller | 425/78 |
| 2,825,092 | 3/1958 | Hatch et al. | 425/78 |
| 2,876,844 | 1/1959 | Hall | 166/126 |
| 3,168,759 | 2/1965 | Johannigman | 425/78 |
| 3,172,156 | 3/1965 | Belden | 425/78 |
| 3,191,232 | 6/1965 | Haller | 425/78 |
| 3,337,916 | 8/1967 | Smith | 425/78 |
| 3,414,940 | 12/1968 | Vinson | 425/78 |
| 3,460,202 | 8/1969 | Graf et al. | 425/78 |
| 3,492,696 | 2/1970 | Haller | 425/78 |
| 3,587,136 | 6/1971 | Hermes | 425/78 |
| 3,635,617 | 1/1972 | Hara | 425/78 |
| 3,640,654 | 2/1972 | Smith | 425/78 |
| 3,677,673 | 7/1972 | Shapiro | 425/78 |
| 3,764,244 | 10/1973 | Hurley | 425/78 |
| 3,822,974 | 7/1974 | DeSantis et al. | 425/78 |
| 4,053,267 | 10/1977 | DeSantis | 425/78 |
| 4,068,520 | 1/1978 | Carrieri | 425/78 |

*Primary Examiner*—J. Howard Flint, Jr.

*Attorney, Agent, or Firm*—Webb, Burden, Robinson & Webb

[57] ABSTRACT

In a multi-motion powder compacting press for making a useful article from powdered metal, ceramic or other particulate material, an upper assembly comprising a frame, a driven bull gear, a crankshaft having a cam and a pitman for reciprocally operating one or more upper punches into a die cavity, an improved compacting and ejection assembly depending from the frame and having a pair of inner and outer lower rams, adjustably supported by a pair of vertically spaced pressure plates, and adjustable ejection plates for upwardly ejecting a pressed article from the die cavity. Preferably, the article to be made is a two-level article, the compaction being accomplished by dual upper rams and punches pressing against the inner and outer lower rams, and the article is ejected by the sequential upward movement of lifting means responsive to the cam and below the ejection plates to force them upwardly to first eject one level of the part with the outer punch and finally eject the other level of the part with the inner punch. Means for adjusting the amount of powder fill, the relative positions of the ejection plates and the density split of a multi-level article are disclosed.

22 Claims, 26 Drawing Figures

MULTI-MOTION MECHANICAL PRESS

BACKGROUND OF THE INVENTION

1. Field of the Invention

This invention relates to a powder compacting press and particularly to such a press having multi-motion movement and wherein the pressed parts are ejected upwardly providing more consistency in the composition of the pressed metal parts at higher pressing speeds and previously attainable in mechanical powder presses. The press is useful for compacting metal, ceramic, and other particulates into useful articles, such as bushings.

2. Brief Description of the Prior Art

Heretofore powder presses have generally been classified as hydraulic and mechanical presses. The mechanical presses have been further defined by the number of punches for ejecting the finished part and by the direction of the ejection either upwardly or downwardly. Examples of single punch presses are disclosed in U.S. Pat. Nos. Stokes et. al. 2,389,561; Smith 3,640,654; Claus 1,607,389; DeSantis 4,053,267; DeSantis et al. 3,822,974; Seelig 2,570,989 and Hall 2,867,844. Examples of dual ejection mechanical presses are disclosed in Hurley et al. 3,764,244; Johannigman 3,168,759; Hara et al. 3,635,617; Belden 3,172,156; Smith 3,337,916 and Stokes et al. 2,499,980. Hydraulic power has been used in powder metallurgy presses both for pressing and/or ejection. Various types of hydraulic presses are shown in Carrieri 4,068,520; Hermes 3,587,136; Weidner 2,556,951; Haller 2,640,325; Haller 3,191,232; Whipple 2,253,003; Cutler 2,338,491; Vinson 3,414,940; Graf et al. 3,460,202 and Haller 3,492,696. Rotary presses have also been used, for example see Shapiro 3,677,673.

It is well known in the art of powder pressing that it is important that the density split be substantially in the middle of the pressed part. In the case of a single level part, that is, a part having opposed planar surfaces, such a density split is relatively easy to obtain. In the case of a part having plural levels, however, such a density split is not only difficult to obtain but requires significant modifications to the press. Such modifications comprise a configuration of the punches required, the die table, and the means for ejecting the part. Heretofore mechanical powder metal compacting presses have not been altogether satisfactory from the standpoint of part consistency and production speed. The present invention provides a means for obtaining substantial part consistency even in dual or multi-level parts and provides high production speeds on the order, for example of 1100 parts per hour. The mechanical press of the invention will produce parts on the order of twice as fast as competitive hydraulic presses.

SUMMARY OF THE INVENTION

Briefly, the powder compacting press according to the present invention comprises a conventional straight side press frame including a single crank, bull gear-pinion drive. The frame supports a cam mounted between the bull gear and the frame. An upper assembly in the frame supports the upper punch or punches, a floating die table and a bed plate. A lower assembly is suspended from the bed plate and includes two lower rams, each of which has a permanent pressure plate and moving ejection plate. Outer and inner punches are mounted on the two lower rams. The outer ram is mounted in a floating pot to permit the outer punch to float to assist in splitting the part density. The outer ram can float with or independent of the die table.

Two ejection plates are used. The lower ejection plate provides power for both plates through a set of ejection arms driven by an ejection cam on the crankshaft. A set of gear adjustable lift rods power ejection plate of the outer ram for its ejection power. The rods stay engaged against two sets of split or clapper blocks which are disengaged at the top of the outer ram stroke while the inner ram continues to move upwardly and completes ejection of the part. Ejection of the part may be completely independent of the die table motion and ejection movement is upward motion at all times.

In operation, the upper punch is started downwardly and enters the die cavity approximately ⅛ inch causing the lower ends of the push rods tocontact the upper ends of the core plate push rods. As the ram proceeds downwardly, it pushes the die table downwardly and pressure from the powder fill engages the outer punch, forcing it downwardly. Approximately 5° from the bottom of the crank stroke, the die table bottoms on the bed plate and the outer ram adjusting nut bottoms on the pressure plate when the crank reaches full downward position and overtravels. At this point everything in the assembly is down. Then the upper punch starts back up. At approximately 12° from the bottom or 192° on the cam, the ejection arms are engaged by the ejection downshaft from the crankshaft cam and the arms move up and engage the ejection nut starting the ejection plate upward. Since the ejection plates are tied together by lift rods through split blocks on the outer ram ejection plate, this permits the plates to move at the same time upwardly until split or divider pins engage the bottom of the press bed where ejection of the upper level of the part takes place. Upon further movement of the cam, the cone heads of the lift rods separate the split blocks and allow the cone heads of the lift rods to rise past the split blocks and allow the inner ram to finish the ejection stroke.

The complete structure and operation of the press according to the invention will be understood from a perusal of the following specification and the accompanying drawings.

DETAILED DESCRIPTION OF PRESENTLY PREFERRED EMBODIMENTS OF THE INVENTION

Figure 1:
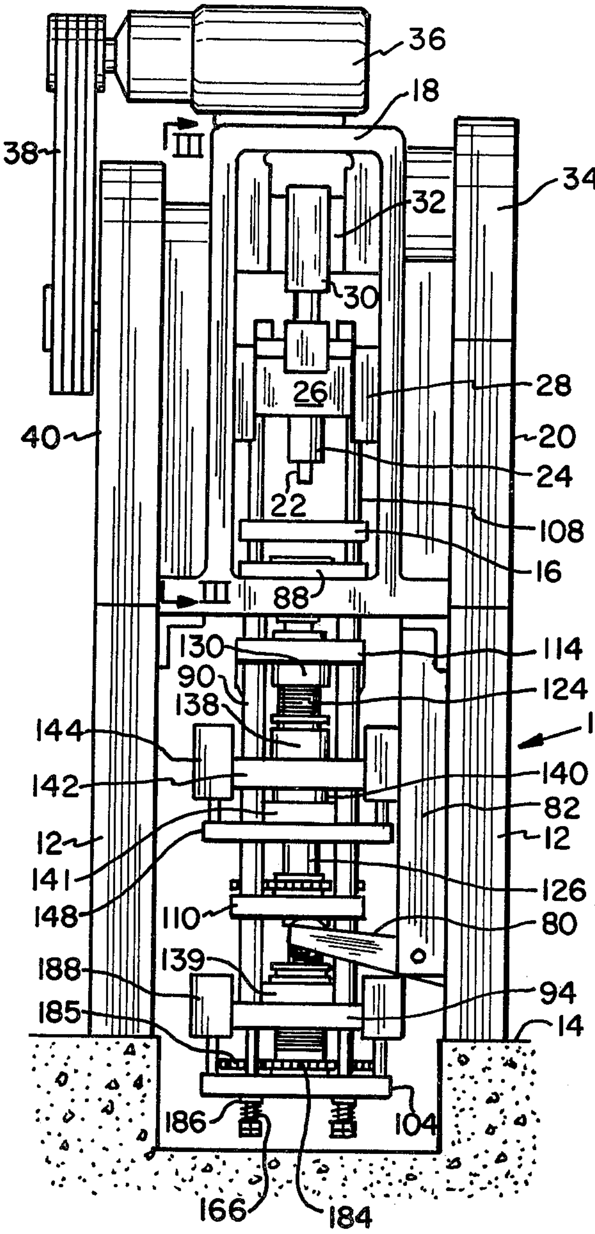
FIG. 1 is a front elevation view of the press according to the invention.
Figure 2:
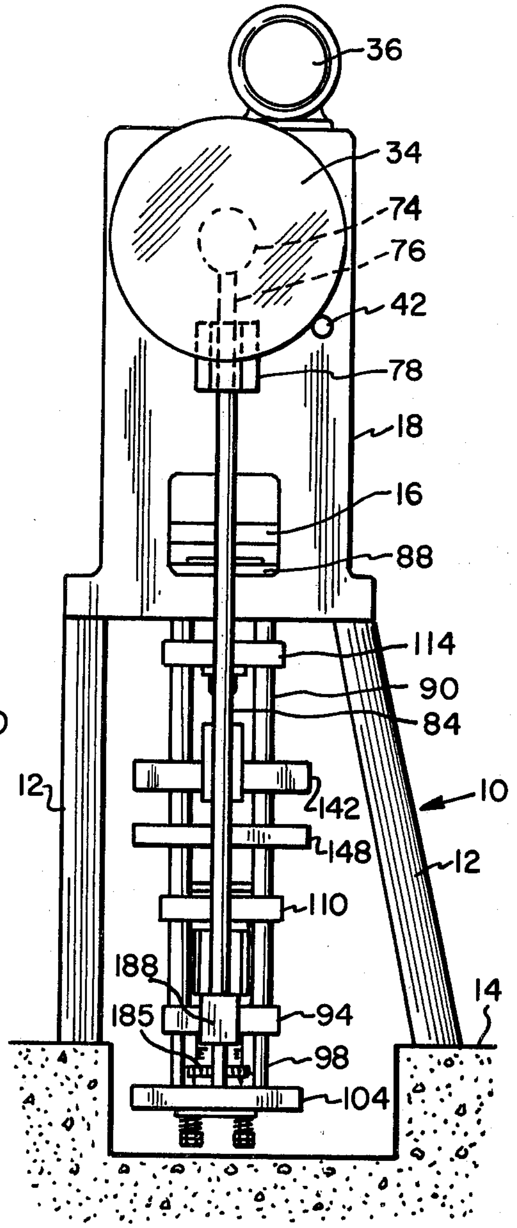
FIG. 2 is a side elevation view of the press of FIG. 1.

Referring to FIGS. 1–6 of the drawings, a powdered metal press, shown generally at 10, includes four upstanding frame members or legs 12 which may be extended below the level of floor 14 to provide stability for the press and to facilitate visual observation of the die table 16 of the press. The legs 12 provide an outer frame support for a one piece case iron frame 18 of the press which is mounted at the upper ends of the frame members. A guard 20 is provided to protect an operator from injury from the internal press ejection system.

Figure 3A:
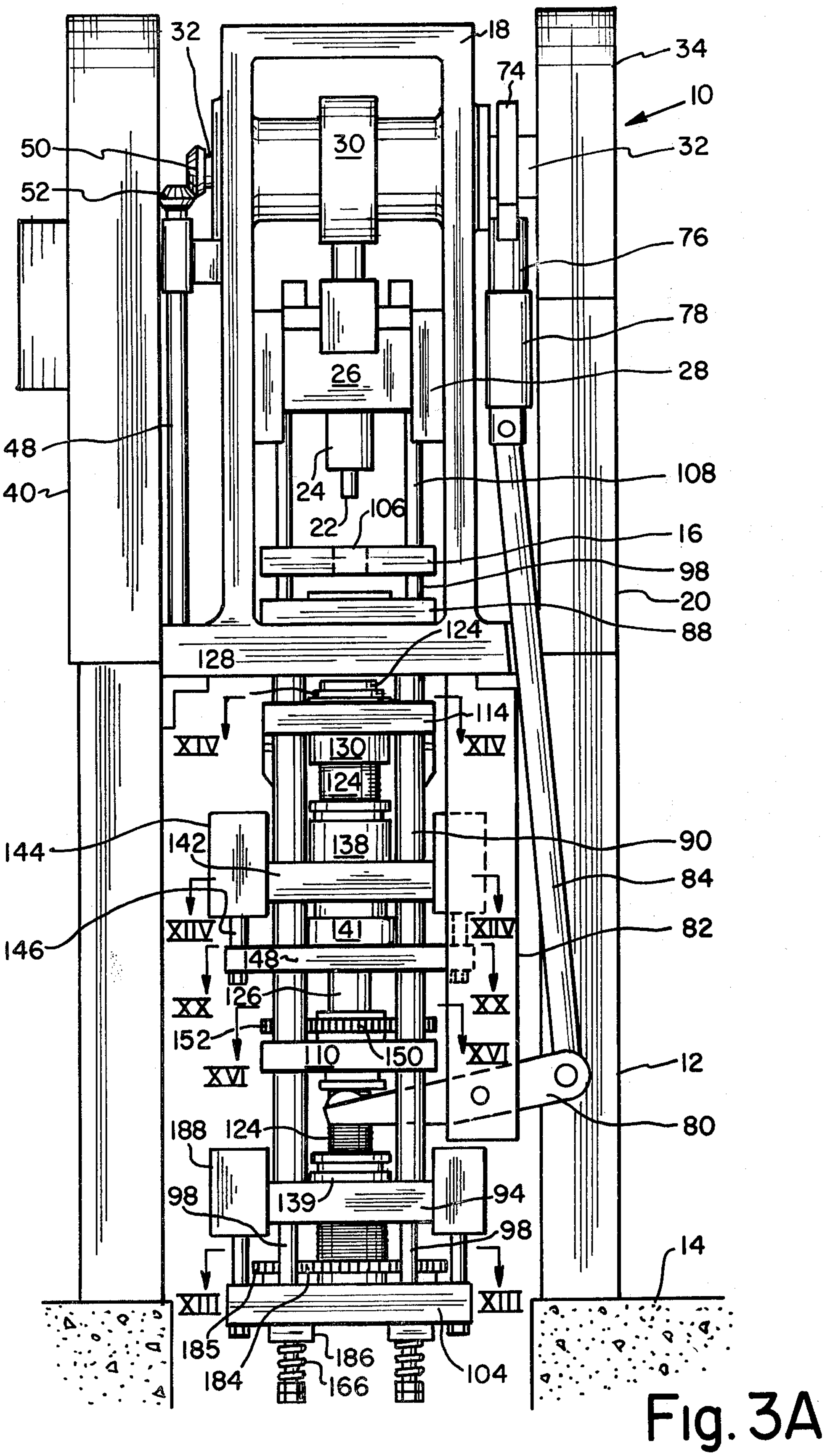
FIG. 3A is an enlarged front elevation view of the press.
Figure 4:
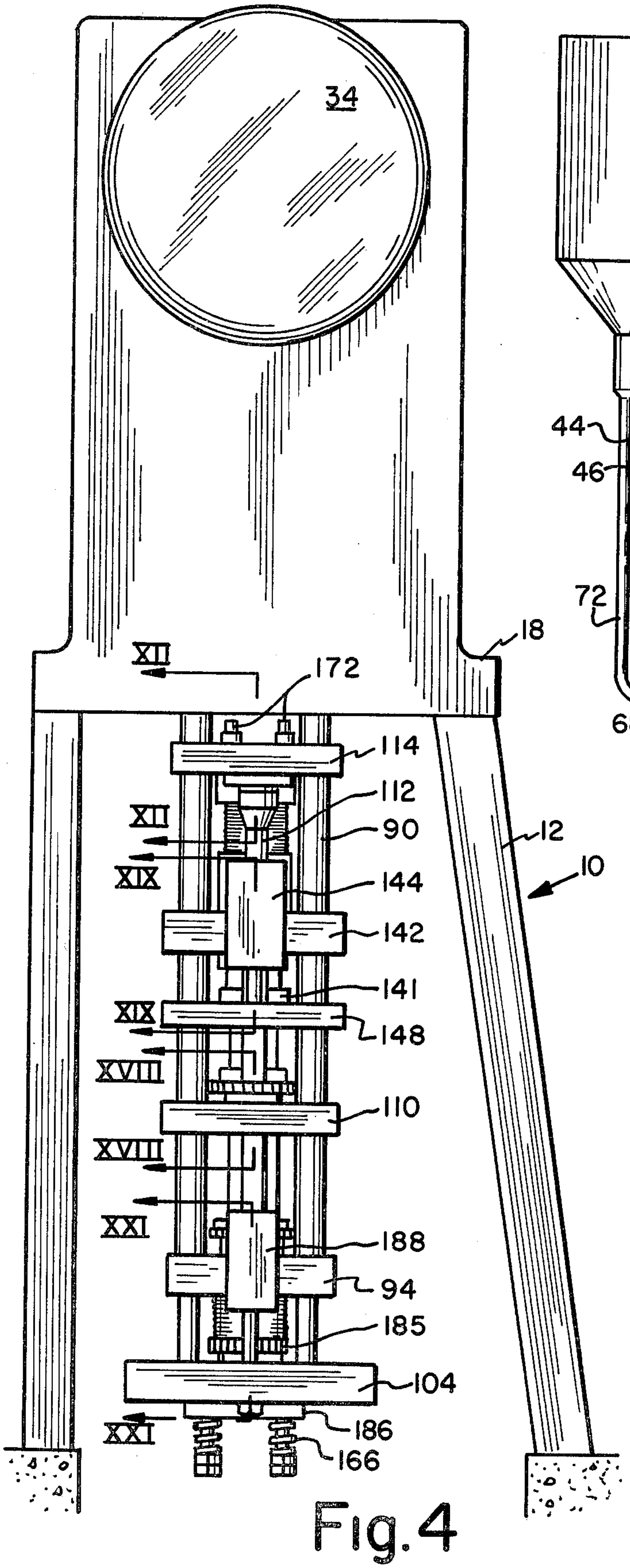
FIG. 4 is an enlarged side elevation view of the press.
Figure 3B:
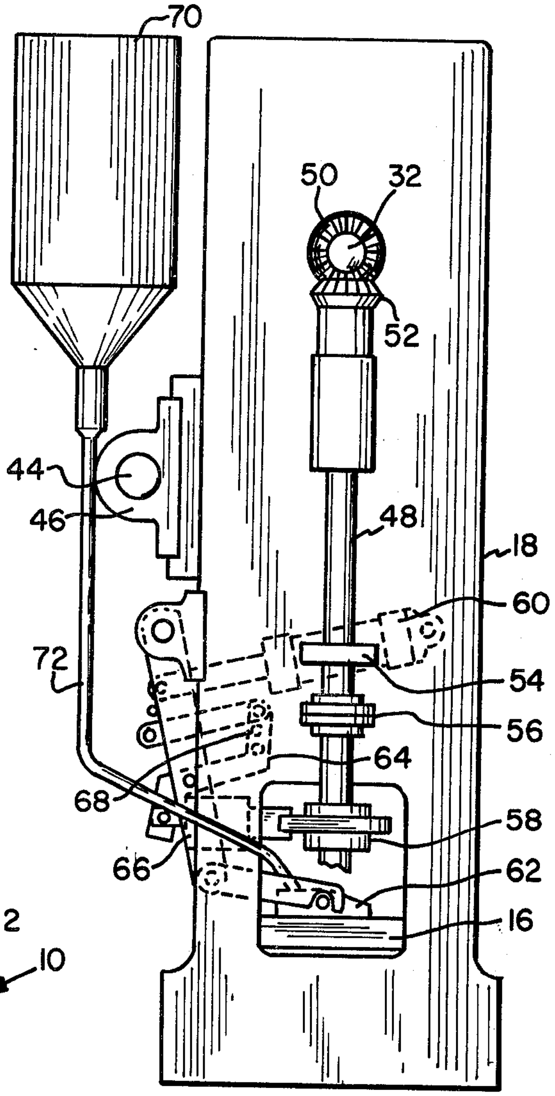
FIG. 3B is an enlarged side elevation of the upper assembly taken along lines III—III of FIG. 1.
Figure 5:
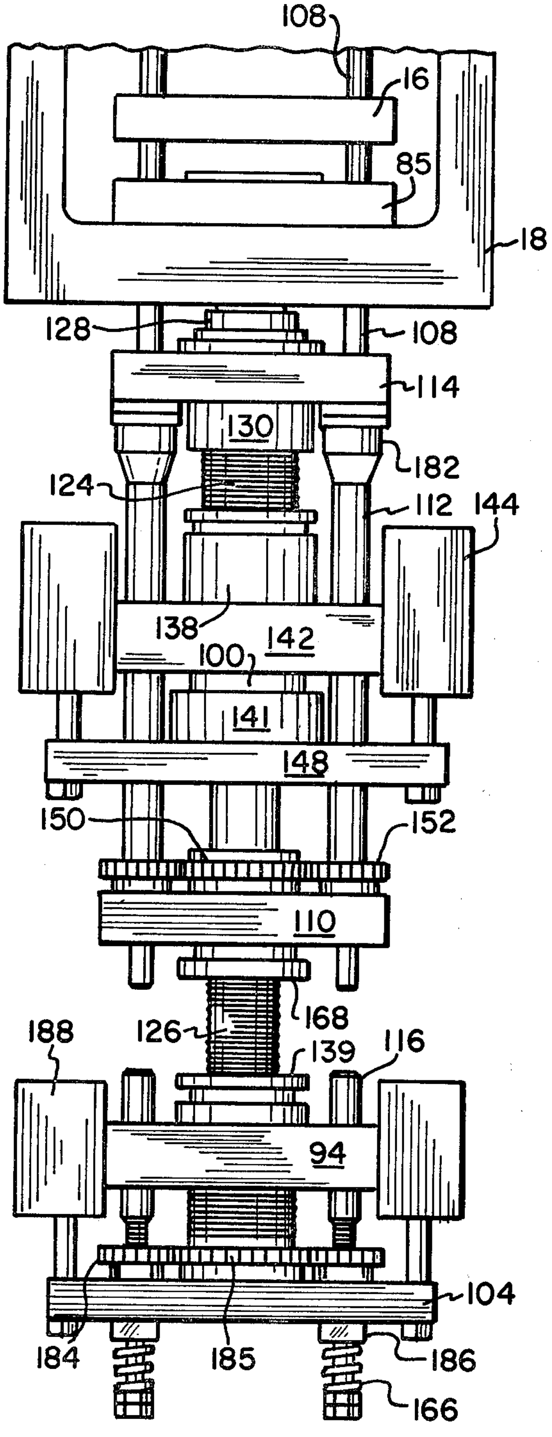
FIG. 5 is an enlarged front elevation view of the lower assembly of the press.
Figure 6:
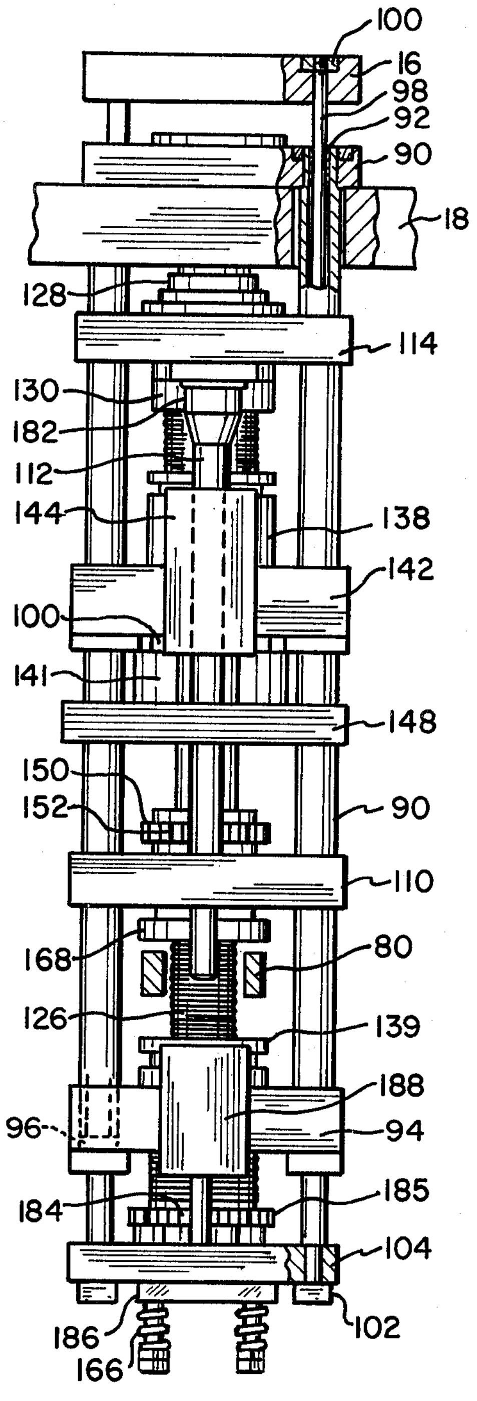
FIG. 6 is an enlarged side elevation view of the lower assembly of the press.

The press is characterized by two upper punches and two lower punches. As shown in FIGS. 1, 3A and 3B, the upper punches 22 and 24 operate in a single pneumatic molding action operated by a cam timed with the stroke of a crank, allowing the inner top punch to maintain pressure on the part with greater travel by the inner punch. The punches are mounted on a top ram slide 26 reciprocally driven vertically in gibs 28 by a pitman 30 mounted on a crankshaft 32 connected to a bull gear 34 which is driven from an external source, such as motor 36.

The press is driven by motor 36 through belts 38 connected to the flywheel of a clutch and brake assembly 40. Torque is transmitted to the bull gear 34 through a pinion 42 mounted on the end of backshaft 44 journaled in a pillow block 46 attached to the back of the press frame 18 (See FIG. 3B). Rotation of the bull gear 34 via the backshaft 44 also causes rotation, via rotation of the crankshaft 32, of a downshaft 48 via gears 50 and 52 and rotation of three cams 54, 56 and 58 on the downshaft. Cam 54 is connected to a cylinder 60 which controls the track of a filler box 62 to shaker cam 58, while cam 56 is an air valve control. Linkage 64 from cylinder 66 in engagement with shaker cam 60 includes adjustment openings 68. As will be appreciated from FIG. 3A, the particulate composition is supplied to the press from a hopper 70 through flexible tubing 72 connected into the top of the filler box 62 which is adapted to be moved laterally across the upper surface of the die table 16 of the press.

Referring to FIG. 3A, an ejection cam 74 is also provided on the crankshaft 32 and cooperates with ejection cam follower 76 which is mounted in a housing 78. Ejection arms 80 are pivotally supported on ejection bearing brackets 82 and connected by a downwardly extending ejection arm push rod 84 to the follower 76. The lower ends of the arms 80 are adapted to cooperate with the lower press assembly to permit ejection of a finished two level powdered metal part 86 such as that shown in FIGS. 22 and 23, as will be described hereinafter.

The lower assembly of the press is suspended from a bed plate 88 by four tubular support posts 90, one positioned at each corner of the assembly. The upper ends of the support posts are threadably engaged in the bed plate and held by nuts 92 (See FIG. 6). The lower ends of the posts 90 extend through laterally extending pressure plate 94 and are held by nuts 96 at the bottom of the assembly.

The die table is supported by four die table support posts 98 which extend through the support posts 90. The upper ends of the posts 98 are threadably engaged into the die table and held by nuts 100 and the lower ends of the posts 98 are held by nuts 102 below core rod plate 104.

Figure 7:
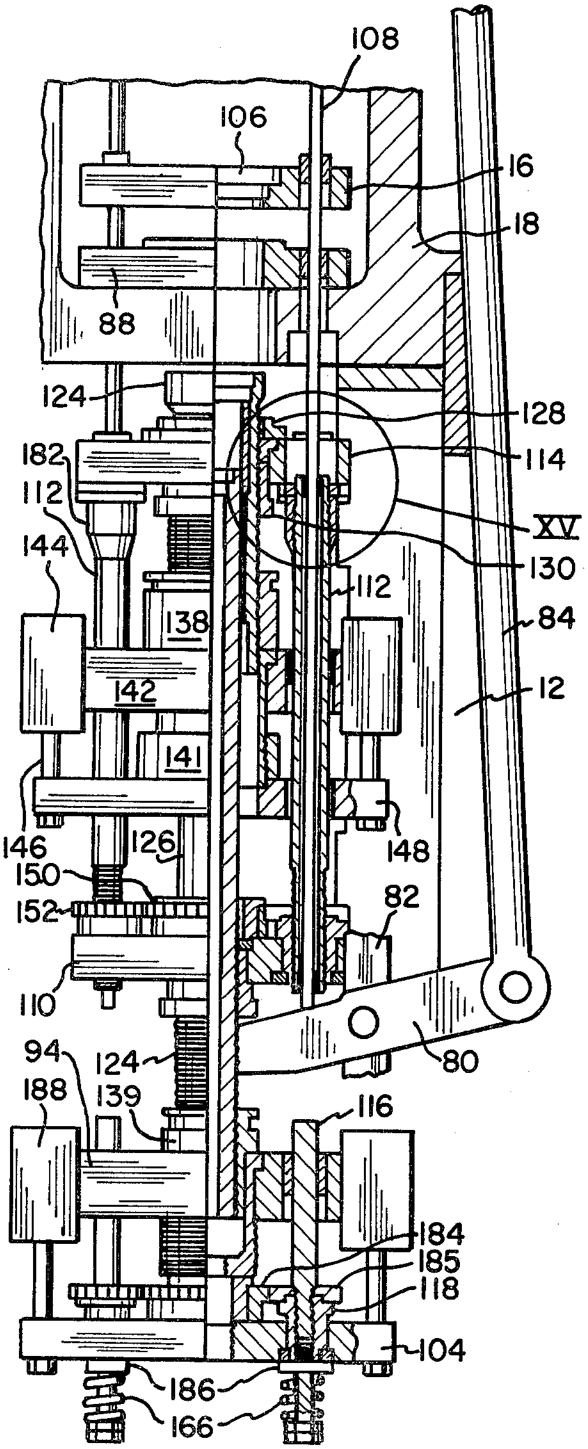
FIG. 7 is a front elevation view of the press with the right-hand side cut away to show the detail of the lower assembly.

The die table 16 includes a cavity 106 for holding the powdered metal fill to be pressed. The die table is floatingly mounted by a pair of die table push rods 108 which extend (as shown in FIG. 7) from the top ram slide 26 to below ejection plate 110 of the lower assembly. The die table push rods 108 extend within tubular hollow lift rods 112 located between upper ejection plate 114 and lower ejection plate 110. The ends of the die table push rods 108 extend below ejection plate 110 and are aligned with, but normally separated, from core rod plate push rods 116 which are threaded into a collar 118 which is held in core rod plate 104 by hub nut 119 (FIG. 7).

The lower assembly of the press provides improved means for compacting and ejecting the finished workpiece.

Two lower punches 120, 122 (See FIG. 8) are operable from two independent lower rams. The larger punch 120 of the two punches is mounted on an outer ram 124 and the smaller or inner punch 122 is mounted on the smaller or inner ram 126. Each ram is provided with independent fill adjustment and pressure plates.

Figure 15A:
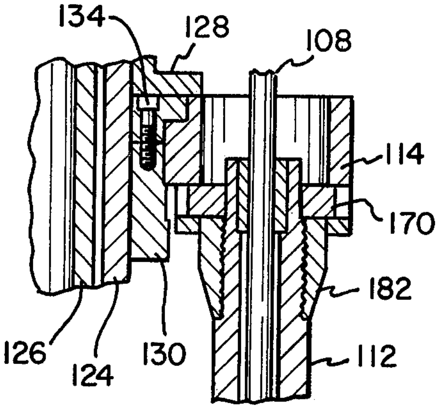
FIG. 15A is an enlarged section of the circled portion XV of FIG. 7, with the clapper blocks closed.

As shown in FIG. 3A, outer ram 124 extends above ejection plate 114 and is connected thereto by a key plate 128. The position of the outer ram 124 with respect to the ejection plate 114 is determined by an ejection nut adjustment assembly comprising an ejection nut 130 and threaded fasteners 134 (See FIGS. 7 and 15A).

Figure 19:
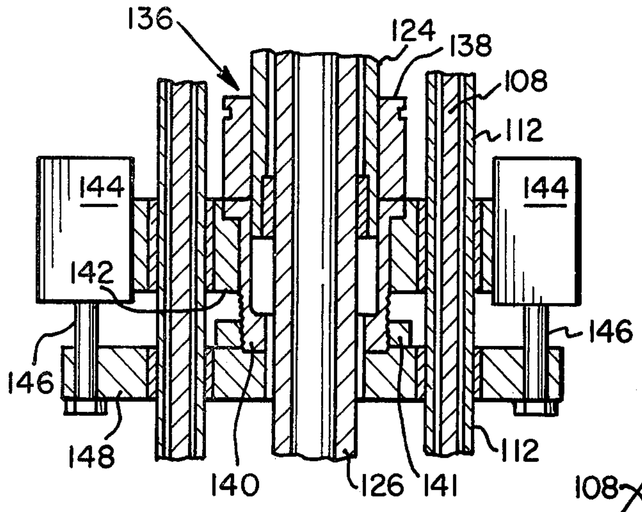
FIG. 19 is a section taken along lines XIX—XIX of FIG. 4.
Figure 20:
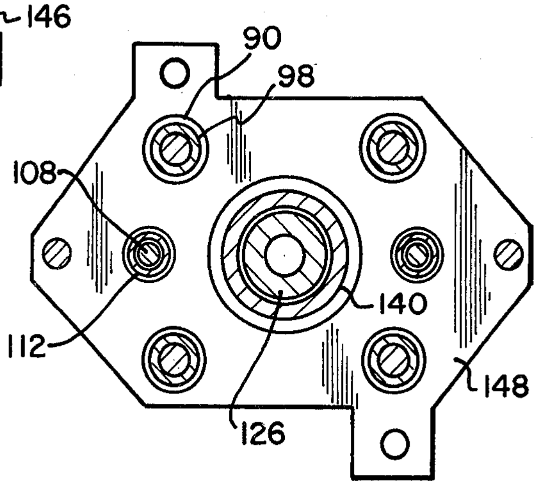
FIG. 20 is a section taken along lines XX—XX of FIG. 3A.
Figure 21:
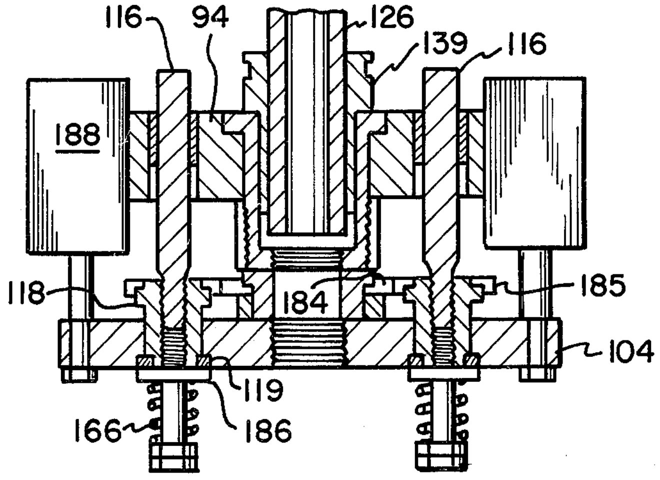
FIG. 21 is a section taken along lines XXI—XXI of FIG. 4.

The inner ram 126 extends vertically within the outer ram 124 which is adjustable by an outer ram float adjustment and lock assembly 136 (See FIG. 19). A fill adjustment 138 is also provided. As shown in FIG. 19, an outer ram float pot 140 is positioned between the fill nut adjustment 138 and a pressure plate 142. The amount of float is determined by an adjustment nut 141 threaded to pot 140. Outer ram float air cylinders 144 are provided on opposite sides of the pressure plate 142 and are connected via cylinder rods 146 to outer ram float plate 148. The pressure plates 94 and 142 provide the finished compacting position; they are stationary with respect to the press frame.

Figure 16:
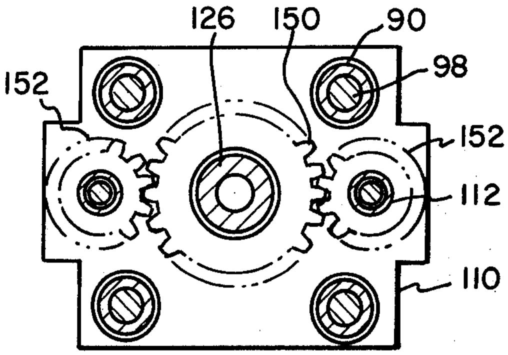
FIG. 16 is a section taken along lines XVI—XVI of FIG. 3A.
Figure 17:
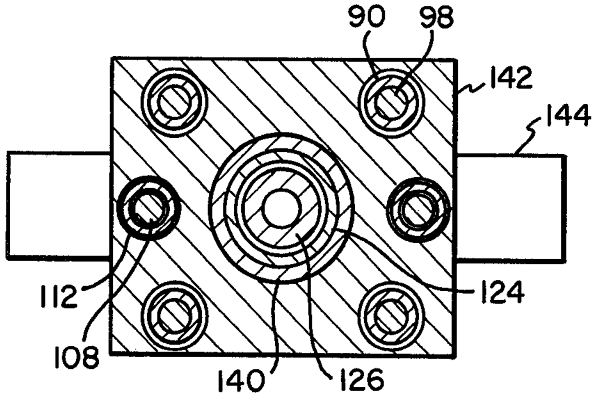
FIG. 17 is a section taken along lines XVII—XVII of FIG. 3A.
Figure 18:
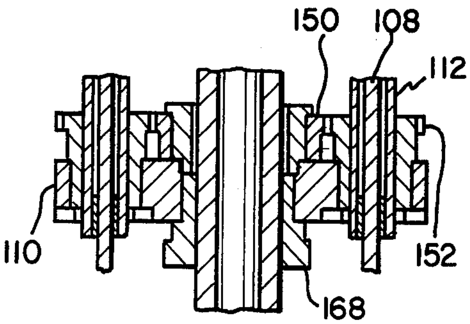
FIG. 18 is a section taken along lines XVIII—XVIII of FIG. 4.

The inner ram 126 extends through the outer ram float plate 148 and gear means comprising a Browning gear 150, the outer driven gears 152, mounted on a hub 103, which engage the ejection lift rods 112 (See FIG. 16), are provided adjacent ejection plate 110.

Figure 22:
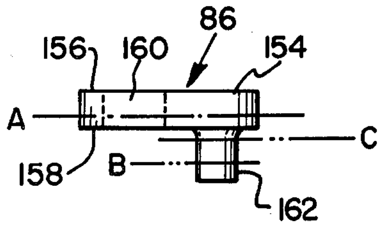
FIG. 22 is an elevation view of a finished two-layer part made in the press.
Figure 23:
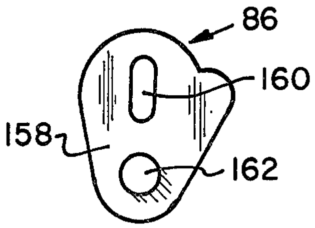
FIG. 23 is a bottom plan view of the part of FIG. 22.

The details of the press are best understood with reference to the four operating conditions of the press structure during the pressing of a two-level part 86, such as that shown in FIGS. 22 and 23. The part, in the form of a bushing illustrated comprises a body 154 having a top surface 156, a lower surface 158 on one end and a slot 160 therein. The opposite end of the part comprises an extended post 162. The four major positions or conditions of the press required to make such a part are shown in FIGS. 8–11. They are FIG. 8: "Fill;" FIG. 9: "Compaction," FIG. 10: "Ejection outer punch;" and FIG. 11: "Ejection inner punch."

At the outset, the die table 16 is in the full "up" position. Air is provided to cylinders 188 which maintain the die table position. Upper fill nut 138 and a lower fill nut 139 are adjusted to determine finished part length and fill.

Figure 8:
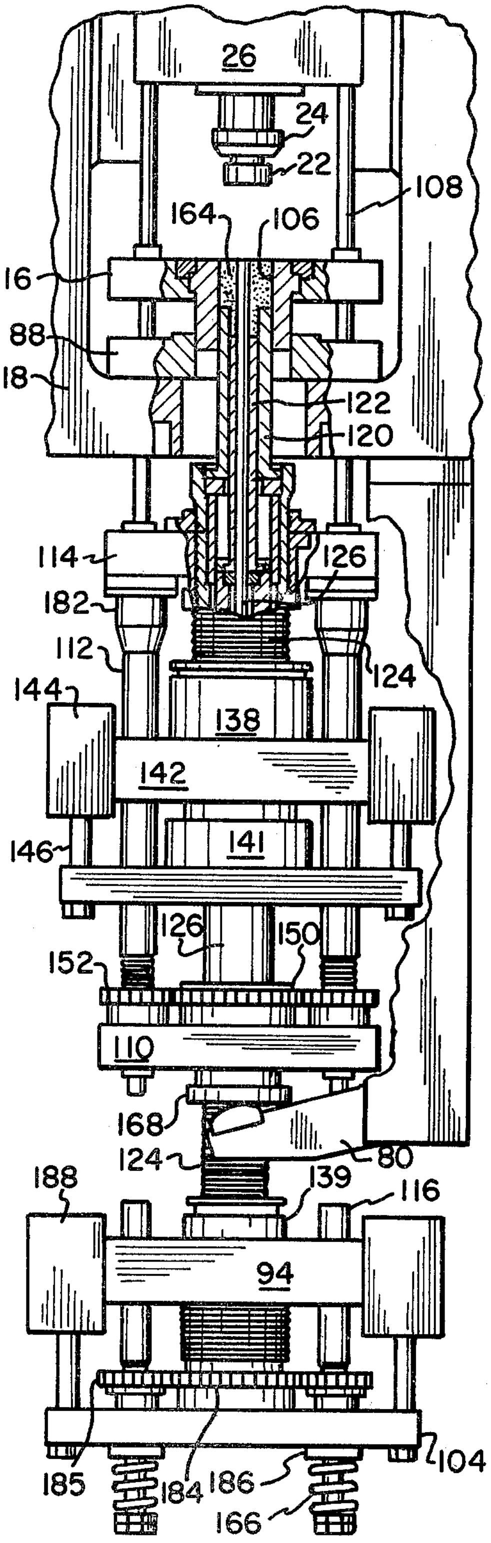
FIG. 8 is a front elevation view of the press in the "fill" position showing the upper part of the lower assembly in detail.
Figure 9:
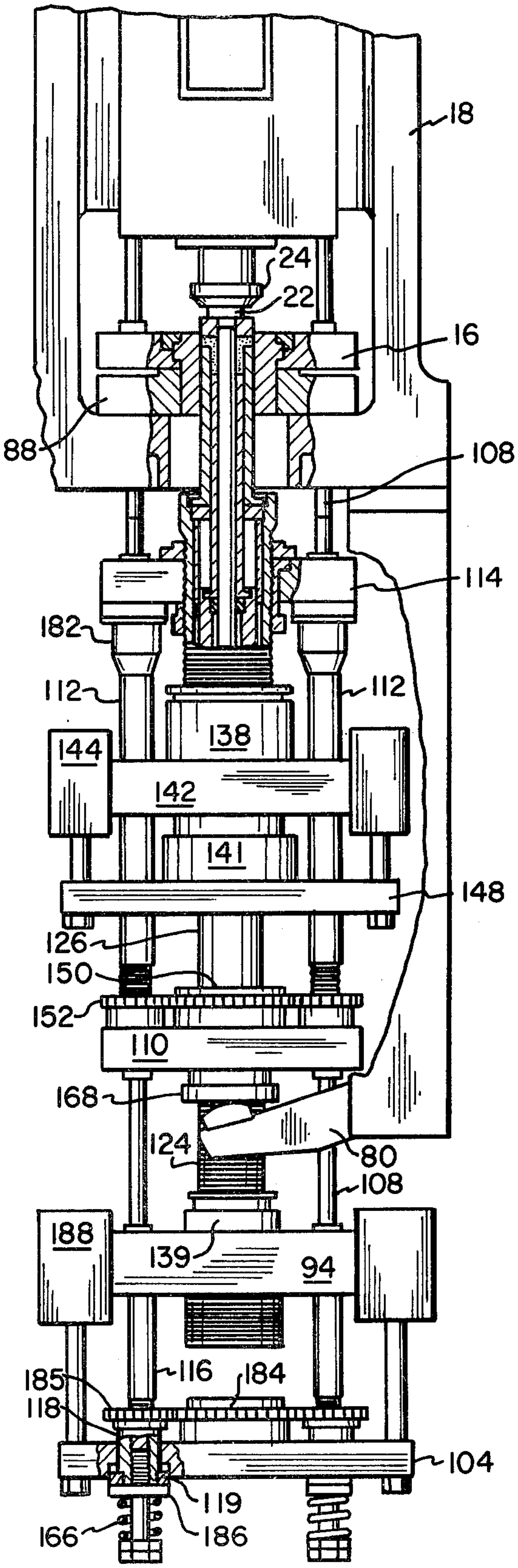
FIG. 9 is a front elevation view of the press in the "compaction" position showing the upper part of the lower assembly in detail.

In the "Fill" position shown in FIG. 8, the upper punches 22, 24 are separated from the die table 16 by a sufficient distance to permit powdered metal 164 to be disposed in the die table cavity 106 from a convenient hopper 70 as is conventional in the art. The die table 16 is shown spaced above the press bed plate 88. The inner punch 122 and the outer punch 120 are both down as far as possible. When filling of the die table cavity 106 is complete, the compaction process is begun.

The inner upper punch 22 is moved downwardly and enters the die cavity 106 approximately ⅛ inch causing the lower ends of the push rods 108 to contact the upper ends of the core plate push rods 116. As the top ram slide 26 proceeds downwardly, it pushes the die table 16 downwardly and pressure from the powder fill 164 in the cavity 106 engages the upper outer punch 24 forcing the punch upwardly. Approximately 5° from the bottom of the crank stroke, the die table 16 bottoms on the bed plate 88 and the outer ram adjusting nut 138 bottoms on pressure plate 142 when the crank reaches full downward position, and overtravels in the "Compaction" condition causing overtravel spring plate 186 to collapse springs 166 and absorb the overtravel pressure. (See FIG. 9). At this point the entire lower press assembly is down, the actual full tonnage of the press is realized, and air is driven from the air cylinders 188 into a reservoir (not shown). Upon final compaction of the part 86, both of the lower rams 124, 126 rest on stationary plates which provide a solid base necessary for consistency of the part.

The dual lower rams are controlled by the single cam on the crankshaft 32 for ejection of the part. Ejection is performed by an upward movement of the lower punches 120, 122. While ejection takes place, the die table 16 is driven upwardly only by pressurized air fed into air cylinders 188. In all instances, no die table movement is needed at any time for ejection.

Figure 10:
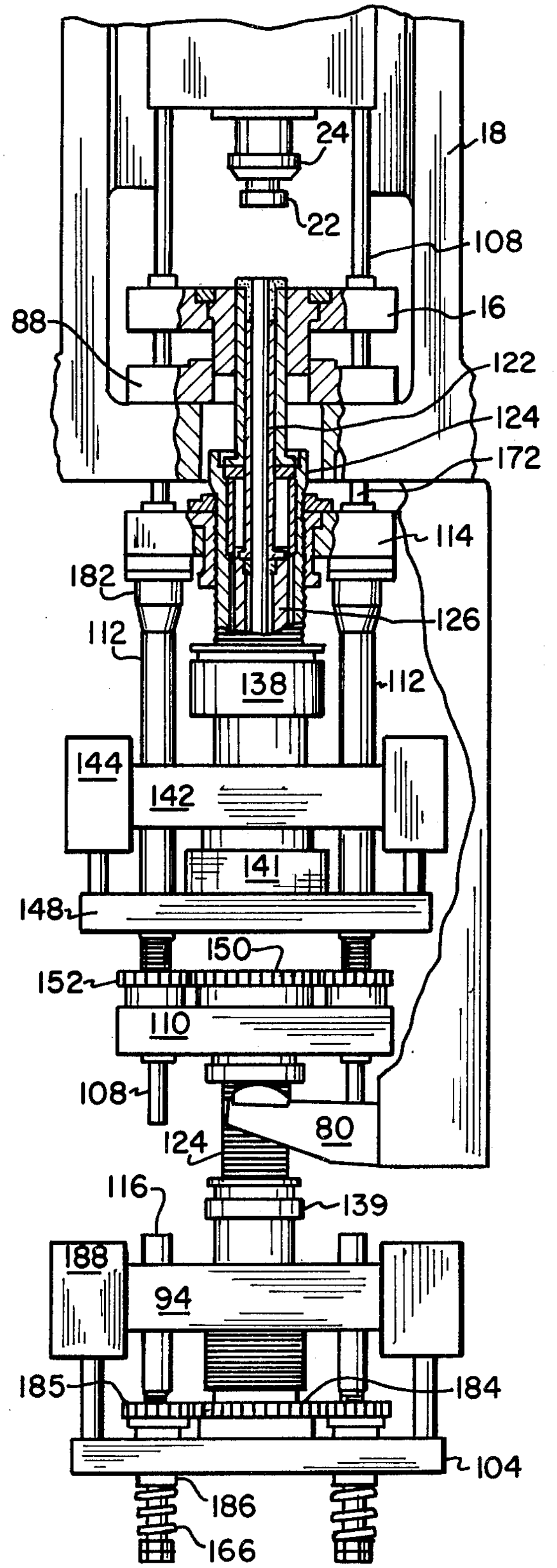
FIG. 10 is a front elevation view of the press in the "ejection" position for the outer punch.
Figure 11:
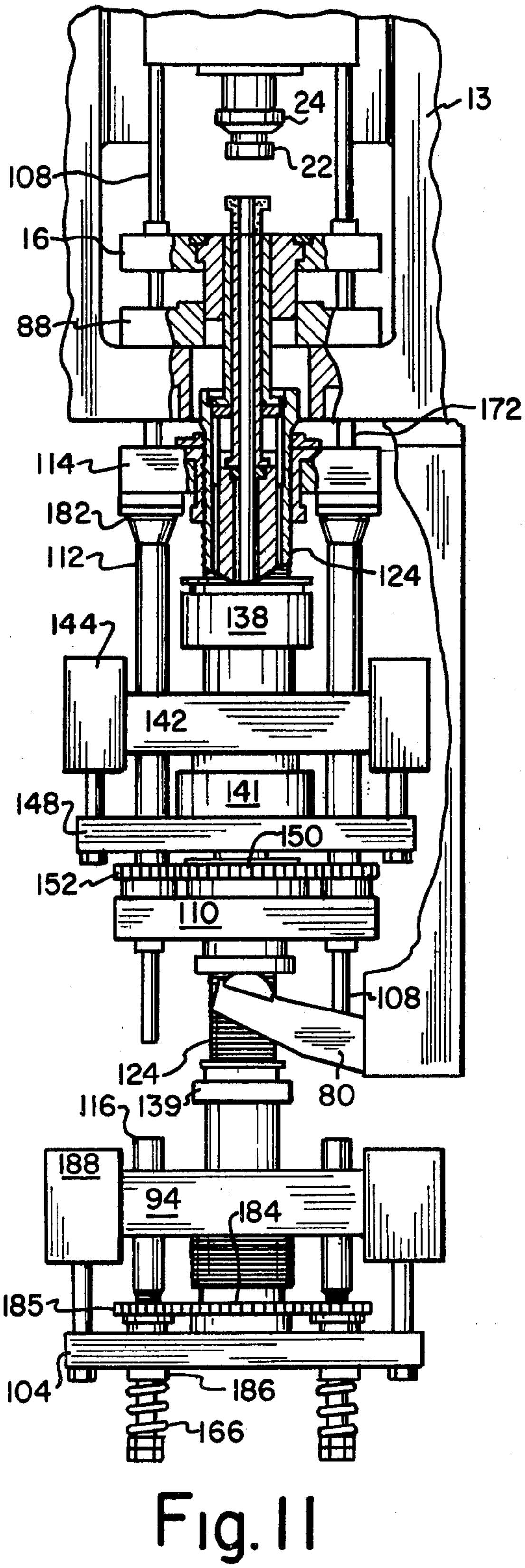
FIG. 11 is a front elevation view of the press in the "ejection" position for the inner punch.
Figure 12:
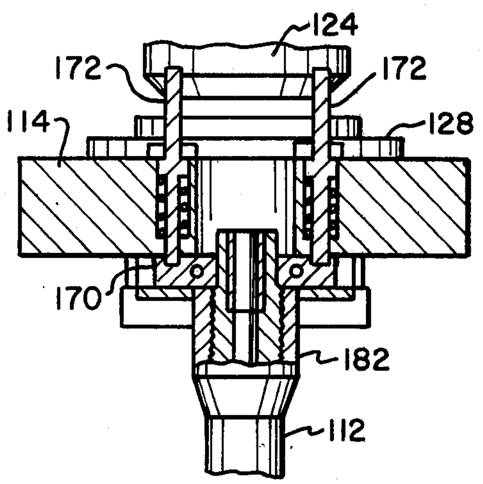
FIG. 12 is a partial section taken along lines XII—XII of FIG. 4.
Figure 15B:
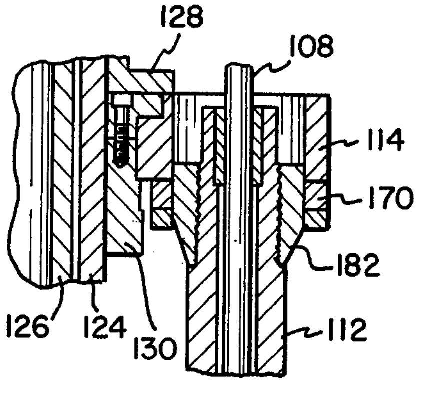
FIG. 15B is an enlarged section, similar to FIG. 15A, with the clapper blocks open.
Figure 15C:
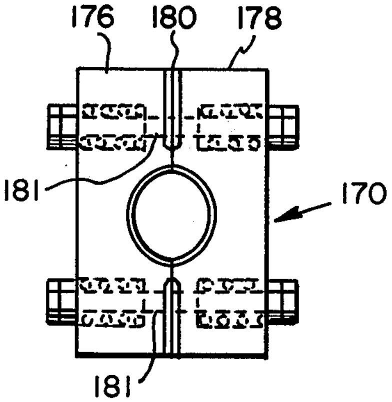
FIG. 15C is a top plan view of a clapper block.

During ejection, the lower punches 120, 122 begin their upward travel. At approximately 12° from the bottom or 192° on the cam, the ejection arms 80 are powered by the ejection arm push rod 84 from the crankshaft cam 76 and the arms 80 move up and engage the ejection nut 168 starting the ejection plate 110 upward. Since the ejection plates 110 and 114 are tied together by lift rods 112 to split or clapper blocks 170 on the ejection plate 114 (See FIG. 12), this permits the plate 114 to move at the same time upwardly until divider pins 172 engage the bottom of the press frame 18 where ejection by the outer punch 120 takes place (FIG. 10). The split blocks 170 are separated by the downward action of cone heads of the divider pins in the grooves 174 between block sections 176, 178 acting against springs 180 on rods 181 (FIG. 15C). This permits cone head 182 of the lift rods 112 to rise past the split blocks 170 (as shown in FIG. 15B) and allows the inner ram 126 and inner punch 122 to finish the ejection stroke (See FIG. 11).

The gear train, preferably Browning gears 150 are mounted on top of ejection plate 110 for adjustment of the two lift rods 112 which lift ejection plate 114 during ejection of the part. Ejection plates 110 and 114 must start their lift of the part at the same time, but ejection plate 114 will reach its maximum travel before plate 110. At the time when ejection plate 114 reaches its maximum travel, the plate will be held in place by air cylinders 144, using air over oil. These so-called "hold-up" cylinders are controlled by the cam 56 mounted and timed on the downshaft 48. The cylinders 144 will hold ejection plate 114 until the part has been completely ejected by the plate 110. At this time, the air will release in the hold-up cylinder for ejection plate 114 and both plates 110 and 114 will drop back in place for powder fill.

An important factor in the speed of the press is that fill takes place while the ejection plates are moving into position. Hence, there is no lost motion-time. In addition, consistency of the part is achieved since the inner and outer punches operate at the same position of adjustment on each stroke.

Figure 13:
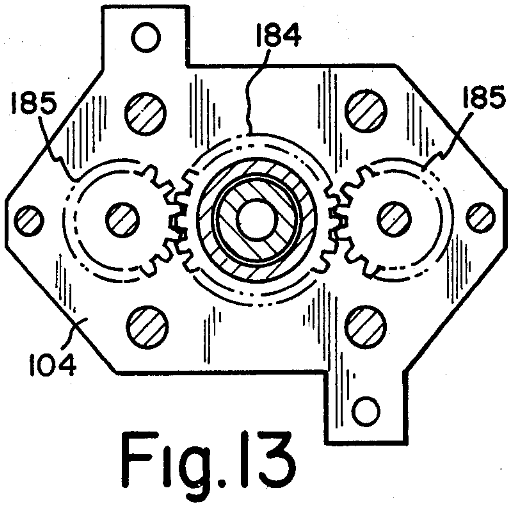
FIG. 13 is a section taken along lines XIII—XIII of FIG. 3A.
Figure 14:
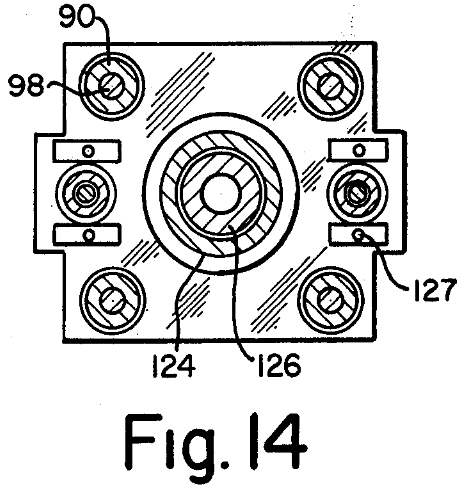
FIG. 14 is a section taken along lines XIV—XIV of FIG. 3A.

The core rod mounting is independent of the two lower rams. It can be mounted to move with the die plate float or it can be stationary as the die plate moves around it. The die plate float is adjustable through gear means, such as gear 184 (FIG. 13), which adjusts push rods 116 to provide the desired plate float and overtravel. Browning gear 184 meshes with outer gears 185 mounted on collar 118. The outer ram float can be tied into the movement of the die table 16 through the core rod plate 104 or movement can be independent of movement of the die table. In this way, density of each level of a two-level part, such as part 86 can be controlled. For example, the density through line A in FIG. 22 can be set to mold at 6.0 and through line B, the density can be set to mold at 7.0 at the same time, or the part can be molded at an even density, such as 6.0, throughout with the density split at line C.

With these possible movements during molding and the upward ejection capability of the lower rams to positively eject the part completely independent of die table motion, an extremely versatile powder compaction press is provided.

In an alternative mode the lift rods 112 can be disengaged and only the inner ram and punch used if it is desired to make a single level part. In this mode, only the lower ejection plate 110 is required for ejection.

The invention is applicable to either mechanical or hydraulically actuated presses of any convenient tonnage. The press can be assembled by skilled laborers and operated by semi-skilled operators.

Having described presently preferred embodiments of the invention, it is to be understood that it may be otherwise embodied within the scope of the appended claims.

I claim:

1. In a press for consolidating powder into a useful article, said press having a support frame mounting an upper assembly including an upper ram slide having an upper punch mounted on a pitman connected to a crankshaft and driven by a bull gear, a die table having a fill cavity and a press bed, the improvement comprising:
- a lower compaction and ejection assembly suspended from the press bed by four hollow support posts, said assembly including:
- an ejection plate;
- at least one pressure plate below the press bed for supporting a lower ram connected to the depending ends of said support posts;
- die plate support posts extending from said die plate through said hollow support posts and connected to a core rod plate at the lower ends thereof;
- a lower ram having a punch and supported on said pressure plate;
- a pair of push rods extending from upper ram slide and extending through the ejection plate; and
- means for raising said ejection plate upon compaction of the powder to lift said lower ram and punch to eject said compacted article from the cavity of the die table.

2. In a press for consolidating powder into a useful article, said press having a support frame mounting an upper assembly including an upper ram slide having an upper punch mounted on a pitman connected to a crankshaft and driven by a bull gear, a die table having a fill cavity and a press bed, the improvement comprising:
- a lower compaction and ejection assembly suspended from the press bed by four hollow support posts, said assembly including:
- a first ejection plate and a second ejection plate spaced vertically therefrom connected to a pair of tubular push rods;
- a pair of spaced pressure plates below the press bed on said posts for supporting a pair of lower rams each having a punch associated therewith;
- die support posts extending from said die plate through said hollow support posts and connected to a core rod plate at the lower ends thereof;
- a pair of rams vertically spaced from one another and supported on said pressure plates;
- a pair of hollow lift rods connecting said ejection plates;
- a pair of push rods extending from the upper ram slide through said lift rods to a point below said lower ejection plate; and
- means for raising said ejection plates upon compaction of the powder to lift said rams to eject the compacted article from the cavity of the die table.

3. The improvement of claim 2 and including:
- an outer punch positioned on an outer ram;
- and an inner punch positioned on an inner ram for contacting the pressed article for ejection from the cavity.

4. The improvement as set forth in claim 1 or claim 2 or claim 3 wherein the raising means comprises cam means provided on said crankshaft, means for following said cam, and including an arm for lifting an ejection plate for vertically raising said rams to eject said article.

5. The improvement as set forth in claim 4 and including means connected to at least one pressure plate for damping the force of said compaction.

6. The improvement as set forth in claim 5 wherein said damping means comprise an air cylinder connected to said pressure plate, the rods of said cylinders being connected to float plates connected to said ram.

7. The improvement as set forth in claim 2 wherein said lower pressure plate includes a pair of upstanding push rods aligned with said lift rods for contact upon connection of a part.

8. The improvement as set forth in claim 2 and including a plurality of spring loaded divider pins extending upwardly from said upper ejection plate for contacting the support frame, and a pair of spring loaded clapper blocks positioned on the bottom of said ejection plate whereby, upon ejection, said lift rods raise said ejection plate until the tops of said divider pins engage said frame and upon further upward movement, said pins separate said blocks and permit further upward travel of said lift rods to permit ejection of the part by said inner ram.

9. The improvement as set forth in claim 8 wherein the lower ends of said pins are cone shaped to facilitate lateral separation of said split clapper blocks.

10. The improvement as set forth in claim 2 wherein said lift rods are provided with rotary gear means for adjusting the length of said lift rods relative to said points of compaction and ejection.

11. The improvement as set forth in claim 10 wherein said gear means comprise at least one Browning gear.

12. The improvement as set forth in claim 2 wherein each of said ejection plates is vertically adjustable with respect to said inner and outer rams relative to the points of compaction and ejection of a part.

13. The improvement as set forth in claim 12 wherein said adjustment is provided by ejection nuts threaded to said inner and outer ram respectively.

14. The improvement as set forth in claim 1 or claim 2 wherein the amount of said powder is determined by adjustment means provided on said inner and outer ram.

15. The improvement as set forth in claim 1 wherein said outer ram includes means for preventing rotation of said ram relative to said ejection plate.

16. The improvement as set forth in claim 15 wherein said means comprises a key plate connected to the top surface of said ejection plate, a vertical keyway in said key plate and the surface of said outer ram and a key disposed in said keyway.

17. The improvement as set forth in claim 1 or claim 2 wherein each of said ejection and pressure plates is generally rectangular and one of said four support posts extends through an opening adjacent each corner of the lower assembly.

18. The improvement as set forth in claim 7 wherein said push rods depend through said core plate and include damping means for absorbing the overtravel of the press upon final compaction of the article.

19. The improvement as set forth in claim 18 wherein said damping means comprise coil springs extending below said core rod plate.

20. The improvement as set forth in claim 1, claim 2 or claim 3 wherein each of the rams and ejection plates is adjustable vertically with respect to the press frame.

21. The improvement as set forth in claim 17 wherein said push rods are vertically adjustable by rotary gear means.

22. The improvement as set forth in claim 4 and including an ejection nut adjacent said ejection plate and the lifting arm engages said nut to raise the ejection plate to eject the article.

* * * * *